(12) United States Patent
Keck, II (10) Patent No.: US 10,556,548 B1
(45) Date of Patent: Feb. 11, 2020

(54) ADJUSTABLE ROOF RACK FOR A VEHICLE

(71) Applicant: Dura Operating, LLC, Auburn Hills, MI (US)

(72) Inventor: Kenneth E. Keck, II, Clinton Township, MI (US)

(73) Assignee: DURA OPERATING, LLC, Auburn Hills, MI (US)

( * ) Notice: Subject to any disclaimer, the term of this patent is extended or adjusted under 35 U.S.C. 154(b) by 0 days.

(21) Appl. No.: 16/113,642

(22) Filed: Aug. 27, 2018

(51) Int. Cl.
*B60R 9/05* (2006.01)
*B60R 9/052* (2006.01)
*B60R 9/058* (2006.01)

(52) U.S. Cl.
CPC ............... *B60R 9/058* (2013.01); *B60R 9/05* (2013.01); *B60R 9/052* (2013.01)

(58) Field of Classification Search
CPC ........... B60R 9/058; B60R 9/05; B60R 9/052; B60R 9/045
USPC ................................ 224/321, 310, 322, 323
See application file for complete search history.

(56) References Cited

U.S. PATENT DOCUMENTS

| | | | | |
|---|---|---|---|---|
| 4,586,638 A | * | 5/1986 | Prescott | B60R 9/058 224/320 |
| 5,038,988 A | * | 8/1991 | Thulin | B60R 9/045 224/322 |
| 6,131,782 A | * | 10/2000 | De Silva | B60R 9/045 224/315 |
| 6,305,589 B1 | * | 10/2001 | Chimenti | B60R 9/045 224/321 |
| 6,398,090 B1 | * | 6/2002 | Chimenti | B60R 9/045 224/315 |
| 7,240,815 B2 | * | 7/2007 | Chimenti | B60R 9/045 224/309 |
| 7,766,200 B2 | * | 8/2010 | Park | B60R 9/048 224/315 |
| 9,187,047 B2 | * | 11/2015 | Sautter | B60R 9/048 |
| 9,718,410 B2 | * | 8/2017 | Cropley | B60R 9/058 |

* cited by examiner

*Primary Examiner* — Nathan J Newhouse
*Assistant Examiner* — Lester L Vanterpool
(74) *Attorney, Agent, or Firm* — Vivacqua Law, PLLC (57) ABSTRACT

An adjustment mechanism includes a first pin connectable to a crossbar, a second pin connectable to a roof rail, a housing assembly disposed on the second pin, the housing assembly including a bearing and a first biasing member both disposed within the housing assembly, the bearing translatable within the housing assembly, the biasing member disposed between the bearing and the housing assembly to bias the bearing member, the first pin disposed through the bearing, and a second biasing member disposed on the second pin between the roof rail and the housing assembly to bias the housing assembly. The first pin is rotatable within the bearing to rotate the crossbar, the first pin is translatable with the bearing to move the crossbar in a first direction and a second direction, and the housing assembly is translatable along the second pin to move the crossbar in a third direction and a fourth direction.

20 Claims, 10 Drawing Sheets

ADJUSTABLE ROOF RACK FOR A VEHICLE

FIELD

The invention relates generally to an adjustable roof rack for a vehicle, and more particularly to a roof rack that includes an adjustable crossbar moveable in multiple degrees of freedom.

BACKGROUND

The statements in this section merely provide background information related to the present disclosure and may or may not constitute prior art.

To increase the cargo capacity of a motor vehicle, a roof rack may be installed on the roof of the motor vehicle. Cargo may be secured to the roof rack which acts as a universal attachment point between the motor vehicle and the cargo. Examples of cargo include ski or snowboards, bikes, cargo cages, or cargo containers, to name but a few. The roof rack is typically attached directly to the roof panel of the motor vehicle.

The roof rack generally includes two roof rails attached to the roof of the vehicle with two or more crossbars extending above and between the roof rails. In certain circumstances, it may be desirable to change the location of the crossbars relative to the roof rails. However, due to aerodynamic and aesthetic factors, a given roof rail may not be straight and instead curved on the sides and top. This makes moving a crossbar having a fixed length difficult. Accordingly, there is a need in the art for a roof rack having an adjustable crossbar assembly that allows the crossbar to be moved to different positions on the roof rail even if the roof rail has curved outer surfaces.

SUMMARY

According to several aspects, an adjustment mechanism for a roof rack of a vehicle is provided. The roof rack includes a roof rail and a crossbar. The adjustment mechanism includes a first pin connectable to the crossbar, a second pin connectable to the roof rail, a housing assembly disposed on the second pin, the housing assembly including a bearing and a first biasing member both disposed within the housing assembly, the bearing translatable within the housing assembly, the biasing member disposed between the bearing and the housing assembly to bias the bearing member, the first pin disposed through the bearing, and a second biasing member disposed on the second pin between the roof rail and the housing assembly to bias the housing assembly. The first pin is rotatable within the bearing to rotate the crossbar, the first pin is translatable with the bearing to move the crossbar in a first direction and a second direction, and the housing assembly is translatable along the second pin to move the crossbar in a third direction and a fourth direction.

In one aspect, the first direction and the second direction are each one of an upward direction and a downward direction relative to the vehicle, and the third direction and the fourth direction are each one of an outward direction and an inward direction relative to the vehicle.

In another aspect, a slide assembly is connectable to the roof rail, the slide assembly defining a cavity and having a slot that communicates with the cavity, wherein the second pin is connected to a slide plate slidably disposed within the cavity and the second pin is disposed through the slot, and wherein the second pin and slide plate are translatable within the slide housing to move the housing assembly and the crossbar in a fifth direction and a sixth direction.

In another aspect, the slide assembly includes a plurality of ribs disposed in the cavity that extend along a length of the slide assembly in the fifth direction and the sixth direction.

In another aspect, the slide plate includes at least one ridge that is substantially perpendicular to the plurality of ribs, and wherein the ridge contacts the plurality of ribs.

In another aspect, the slide assembly includes a second slot substantially parallel with the first slot, and a stud is fixedly connected to the slide plate and is disposed through the second slot.

In another aspect, the fifth direction and the sixth direction are each one of a forward direction and a rearward direction relative to the vehicle.

In another aspect, a third pin is connectable to the roof rail, wherein the housing assembly is disposed on the third pin, and a third biasing member is disposed on the third pin between the roof rail and the housing assembly to bias the housing assembly.

In another aspect, a first fastener is disposed on the first pin and a second fastener is disposed on the second pin.

In another aspect, the first biasing member biases the bearing in one of the first direction and the second direction.

In another aspect, the second biasing member biases the housing assembly in one of the third direction and the fourth direction.

In another aspect, a torsion spring is disposed within the bearing and connected to the first pin and the bearing.

According to several other aspects, an adjustable roof rack includes a roof rail connected to the vehicle, a crossbar, a first pin fixedly connected to the crossbar, a second pin interconnected to the roof rail, a housing assembly disposed on the second pin, the housing assembly including a bearing and a first biasing member both disposed within the housing assembly, the bearing translatable within the housing assembly, the biasing member disposed between the bearing and the housing assembly to bias the bearing member, the first pin disposed through the bearing, and a second biasing member disposed on the second pin between the roof rail and the housing assembly to bias the housing assembly. The first pin is rotatable within the bearing to rotate the crossbar, the first pin is translatable with the bearing to move the crossbar in a first direction and a second direction, and the housing assembly is translatable along the second pin to move the crossbar in a third direction and a fourth direction.

In one aspect, the crossbar includes a bracket connected to a stanchion, and the first pin is fixedly connected to the bracket.

In another aspect, a cover is connected to the crossbar, the cover disposed overtop at least a portion of the housing assembly.

In another aspect, a slide assembly is connected to the roof rail, the slide assembly defining a cavity and having a slot that communicates with the cavity, wherein the second pin is connected to a slide plate slidably disposed within the cavity and the second pin is disposed through the slot, and wherein the second pin and slide plate are translatable within the slide housing to move the housing assembly and the crossbar in a fifth direction and a sixth direction.

In another aspect, the slide assembly is connected to an interior surface of the roof rail.

In another aspect, the housing assembly includes a flange extended therefrom and a hole disposed in the flange, and the second pin is disposed through the hole.

In another aspect, the housing assembly defines a space, the bearing disposed within the space, and the housing assembly includes a first slot and a second slot that each communicate with the space, and the first pin is disposed through the first slot, the bearing, and the second slot.

According to several other aspects, an adjustable roof rack for a vehicle includes a roof rail connected to the vehicle, a crossbar, a first pin fixedly connected to the crossbar, a slide assembly defining a cavity and having a slot in communication with the cavity, the slide assembly connected to the roof rail, a slide plate disposed within the cavity and translatable within the cavity, a second pin connected to the slide plate and disposed through the slot of the slide assembly, a housing assembly disposed on the second pin, the housing assembly including a bearing and a first biasing member both disposed within the housing assembly, the bearing translatable within the housing assembly, the biasing member disposed between the bearing and the housing assembly to bias the bearing member, the first pin disposed through the bearing, and a second biasing member disposed on the second pin between the roof rail and the housing assembly to bias the housing assembly. The first pin is rotatable within the bearing to rotate the crossbar, the first pin is translatable with the bearing to move the crossbar in a first direction and a second direction, the housing assembly is translatable along the second pin to move the crossbar in a third direction and a fourth direction, and the slide plate and the second pin is translatable to move the crossbar in a fifth direction and a sixth direction.

Further aspects, examples, and advantages will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
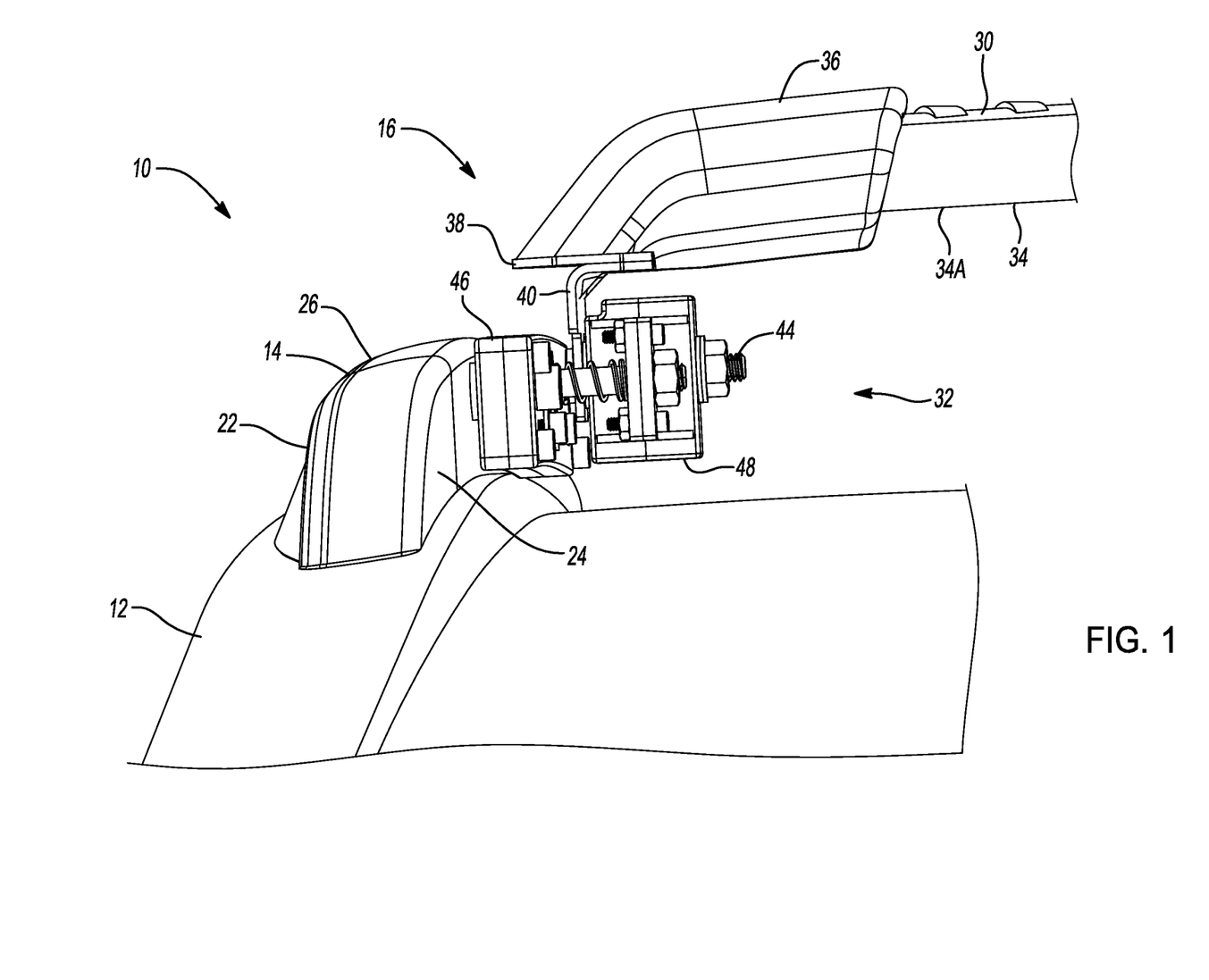
FIG. 1 is a front view of an adjustable roof rack on an exemplary roof of a motor vehicle.
Figure 2:
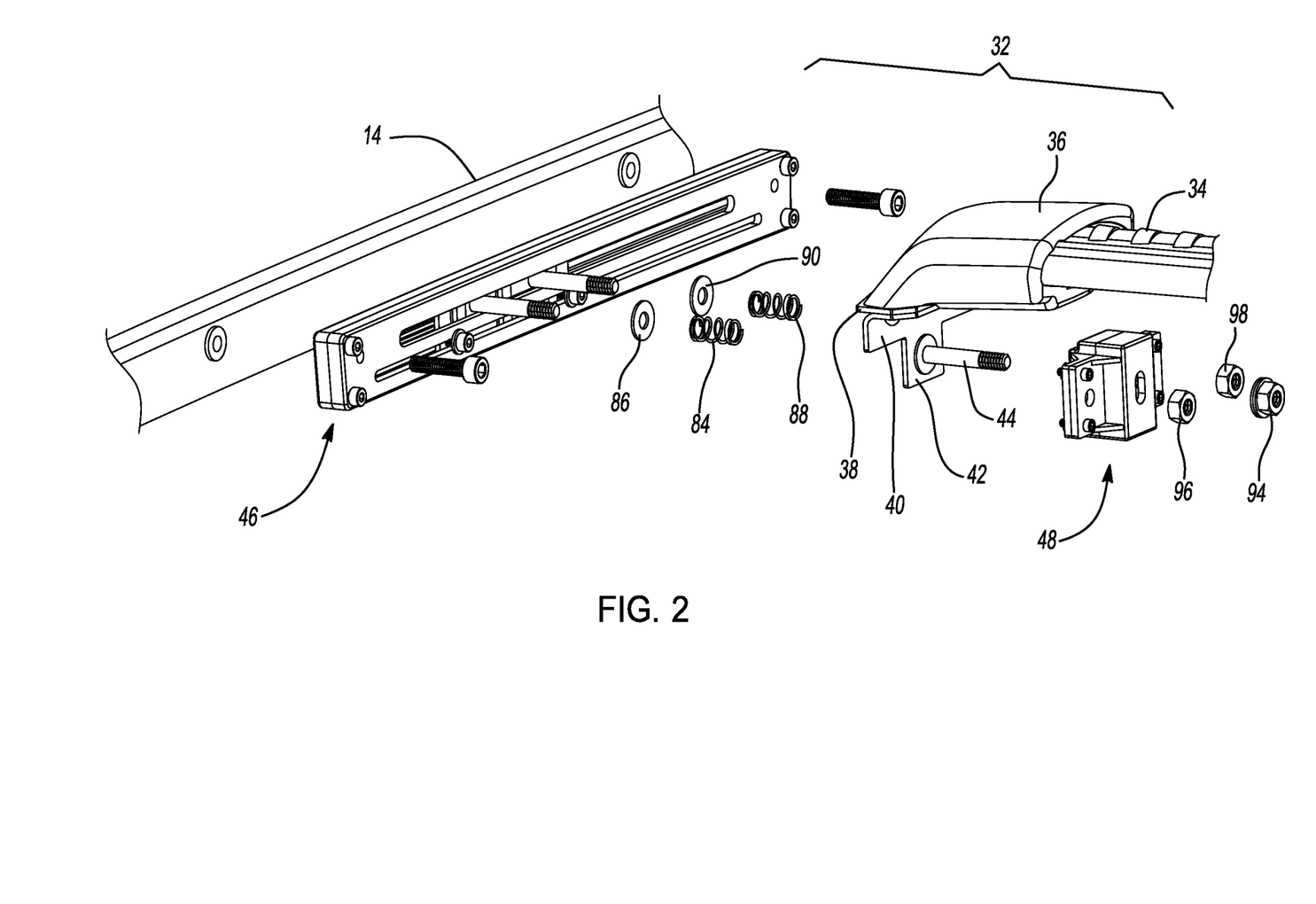
FIG. 2 is a partial exploded perspective view of the adjustable roof rack.

With reference to FIGS. 1 and 2, a roof rack according to aspects of the present disclosure is generally indicated by reference number 10. The roof rack 10 is attachable to a roof 12 of a motor vehicle. The roof 12 may have various sizes, shapes, lengths, contours, etc., without departing from the scope of the present disclosure. The roof rack 10 generally includes a pair of roof rails 14 (only one of which is shown) and a pair of adjustable crossbar assemblies 16 (only one of which is shown). The roof rails 14 are disposed on and connected to the roof 12 running forward and rearward and are spaced apart approximately or substantially parallel to one another. As used herein and throughout the present disclosure, the term "approximately" or "substantially" is known to those skilled in the art. Alternatively, the term "approximately" or "substantially" may be read to mean plus or minus 15 degrees, or in an alternate embodiment, plus or minus 5 degrees. The adjustable crossbar assemblies 16 are connected to the roof rails 14. The adjustable crossbar assemblies 16 are moveable relative to the roof rail 14 in multiple degrees of freedom, as will be described in greater detail below.

In the example provided, each of the roof rails 14 are substantially identical and therefore only one roof rail 14 is described and shown herein. The roof rail 14 includes an exterior side 22 facing outwardly relative to the roof 12 of the motor vehicle and an interior side 24 facing inwardly relative to the roof 12 of the motor vehicle. The exterior side 22 and the interior side 24 extend upward relative to the roof 12 of the motor vehicle. An upper surface 26 connects the exterior side 22 with the interior side 24. It should be appreciated that the roof rail 14 may have various shapes and contours. In the example provided, the upper surface 26 is arcuate or convex while the exterior side 22 and the interior side 24 are curved. In addition, the roof rail 14 may include various other components not specifically illustrated or described such as substrates, covers, trim, lighting, etc., without departing from the scope of the present disclosure.

In the example provided, each of the adjustable crossbar assemblies 16 are substantially identical and therefore only one adjustable crossbar assembly 16 is described and shown herein. The adjustable crossbar assembly 16 generally includes a crossbar 30 and an adjustment mechanism 32. The crossbar 30 includes a longitudinal member 34 having a pair of ends 34A (only one of which is shown) disposed longitudinally opposite one another. A pair of stanchions 36 (only one of which is shown) are connected to the ends 34A of the longitudinal member 34. A base plate 38 is connected to each stanchion 36. A bracket 40 is connected to the base plate 38 and extends down from the stanchion 36. The bracket 40 includes a center portion 42. A center pin 44 is fixedly connected to the center portion 42. The center pin 44 extends inwardly from the center portion 42 and is substantially parallel with the longitudinal member 34.

The adjustment mechanism 32 is configured to allow the crossbar 30 to move in multiple directions relative to the roof rail 14. The adjustment mechanism 32 generally includes a slide assembly 46 connected to an exterior portion of the roof rail 14 and a housing assembly 48 connected to the slide assembly 46. Alternatively, the slide assembly 46 may be formed integrally with the roof rail 14, or contained within an interior portion of the roof rail 14 to conceal the slide assembly 46. The crossbar 30 is connected to the housing assembly 48, as will be described below.

Figure 3:
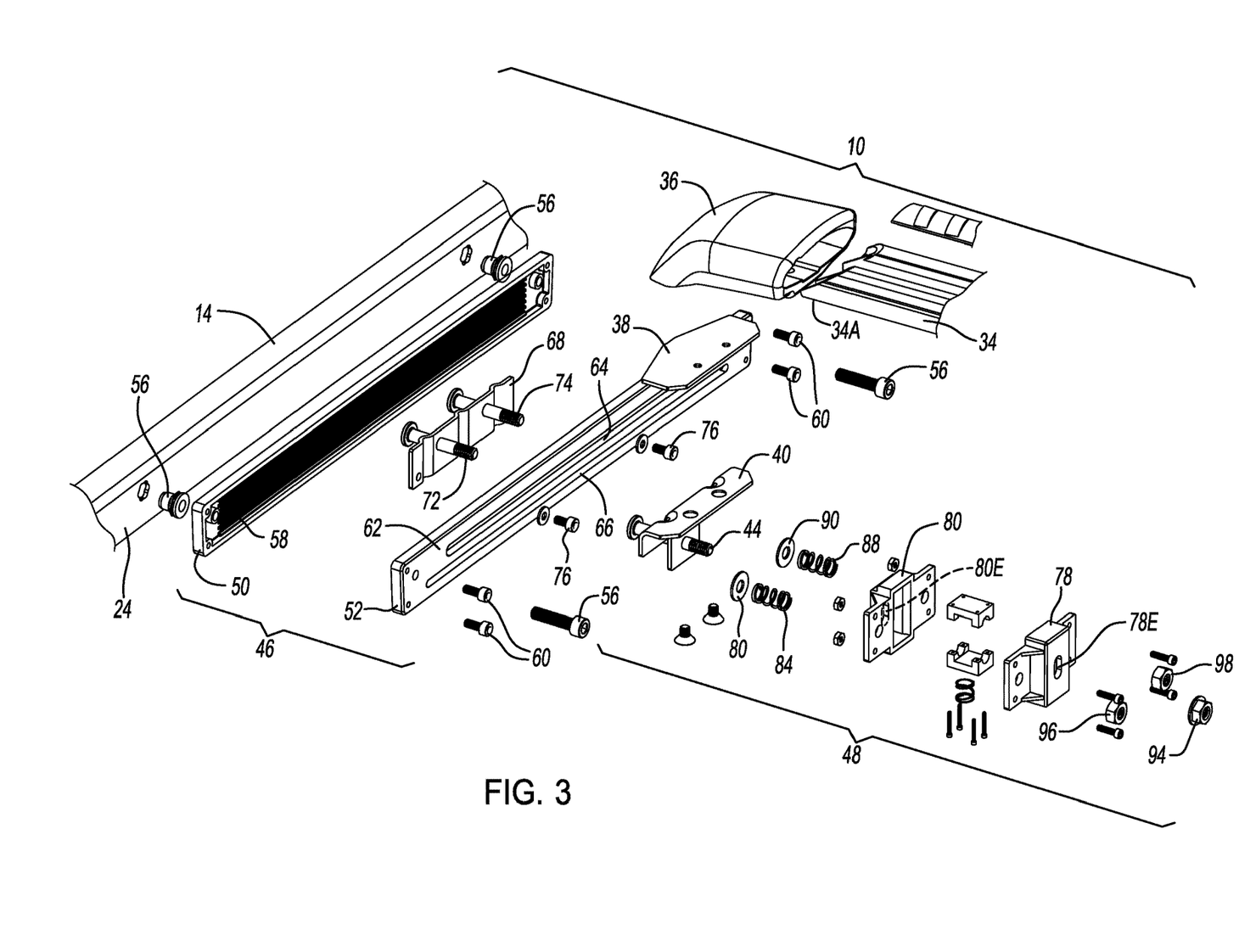
FIG. 3 is an exploded perspective view of the adjustable roof rack.
Figure 4:
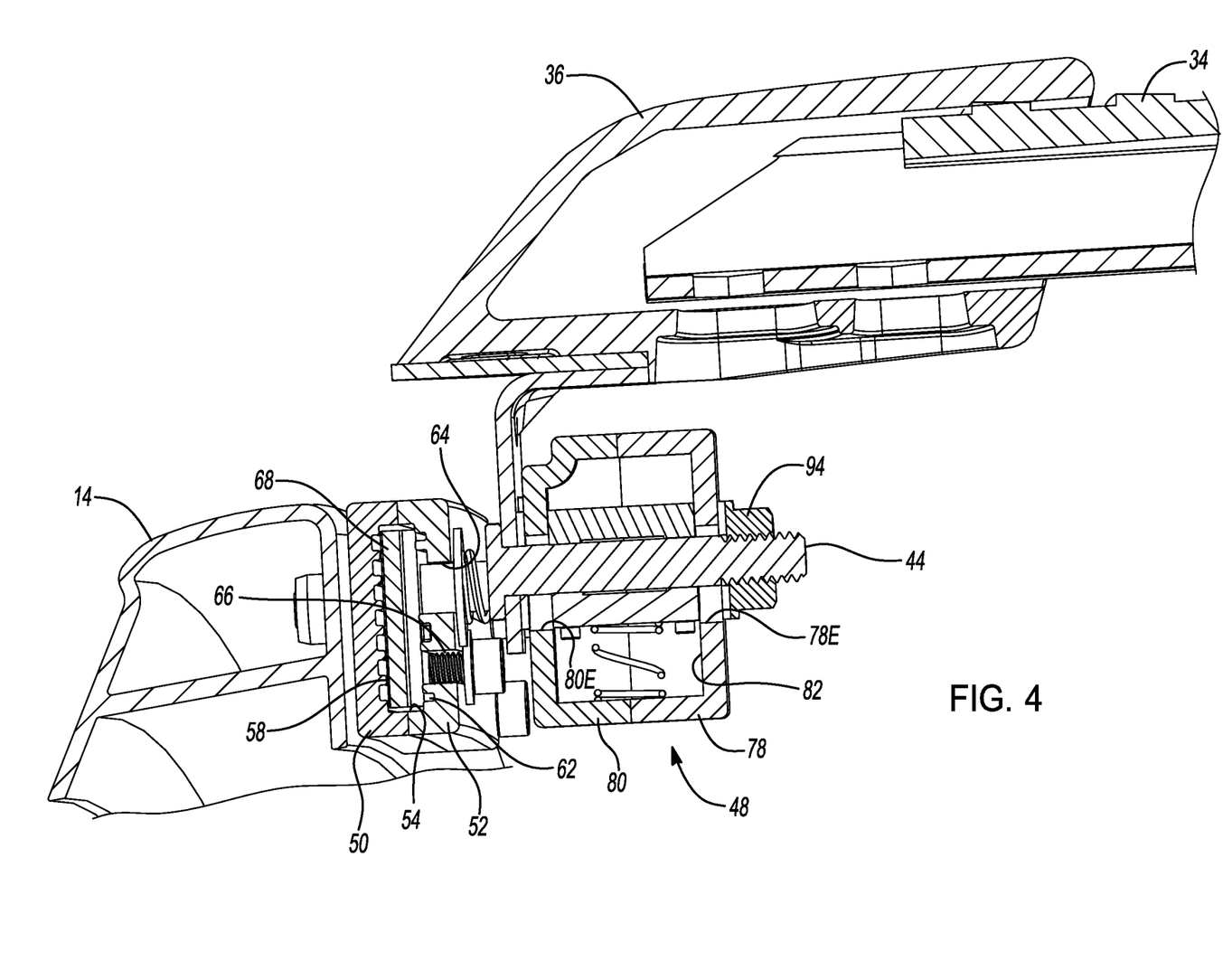
FIG. 4 is rearward looking perspective cross-sectional view of the adjustable roof rack.
Figure 5:
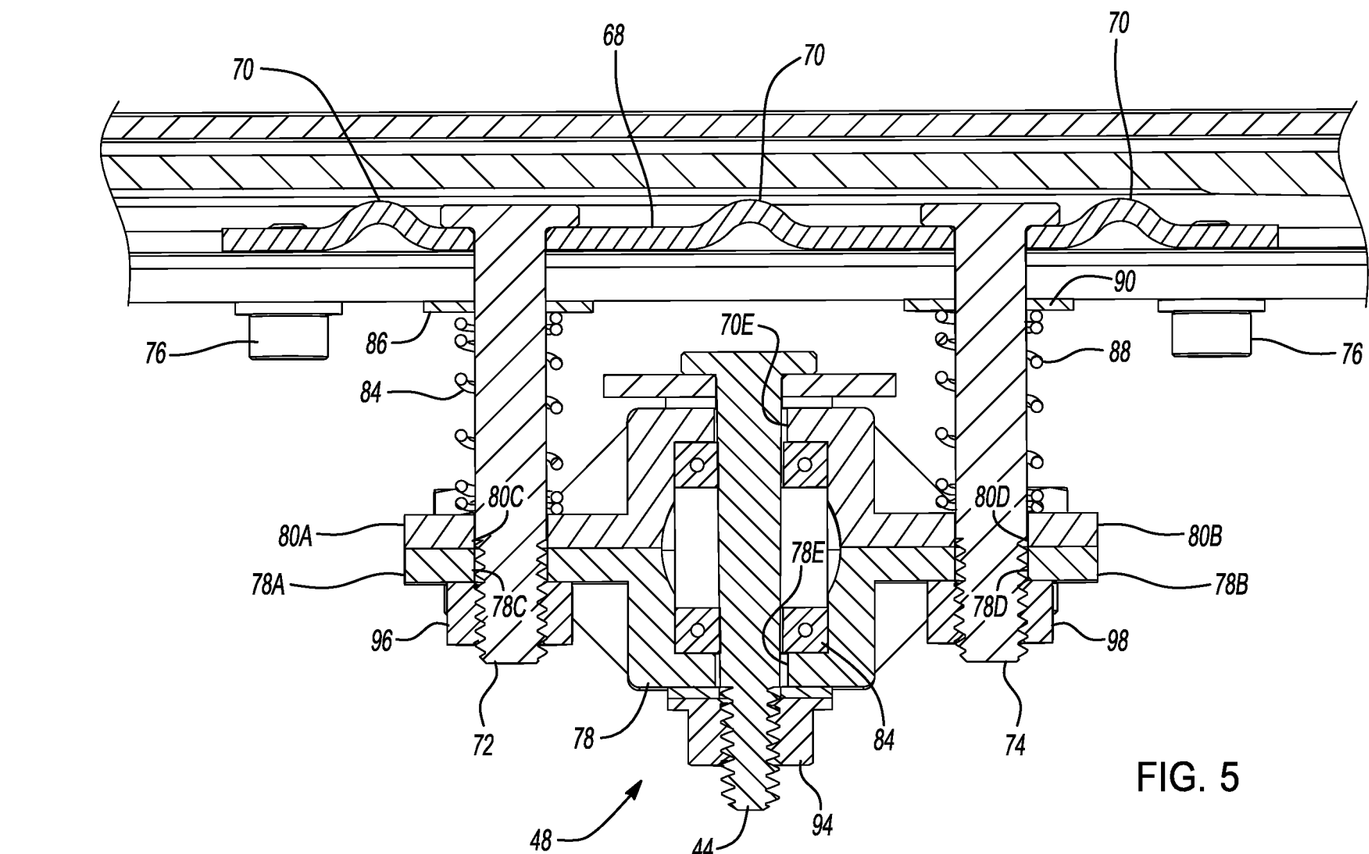
FIG. 5 is downward looking perspective cross-sectional view of the adjustable roof rack.

Turning now to FIGS. 3-5, the slide assembly 46 includes an exterior housing 50 connected to an interior housing 52 that cooperate to define a cavity 54 within the slide assembly 46. The exterior housing 50 is connected to the interior side 24 of the roof rail 14 via fasteners 56. The exterior housing 50 has a plurality of exterior ribs 58 disposed within the cavity 54 that run along a length of the exterior housing 50. Thus, the exterior ribs 58 extend forward and rearward relative to the roof 12 of the motor vehicle. The interior housing 52 is connected to the exterior housing 50 via fasteners 60. The interior housing 52 includes a plurality of interior ribs 62 disposed within the cavity 54 that run along a length of the interior housing 52 opposite the exterior ribs 58. Thus, the interior ribs 62 extend forward and rearward relative to the roof 12 of the motor vehicle. The interior housing 52 also includes a first slot 64 and a second slot 66 that both extend into the cavity 54. The first slot 64 and the second slot 66 run along a length of the interior housing 52. The first slot 64 and the second slot 66 are parallel to one another and extend forward and rearward relative to the roof 12 of the motor vehicle.

A slide plate 68 is disposed within the cavity 54 of the slide assembly 46. The slide plate 68 is configured to slide or translate within the cavity 54 in a forward direction and a rearward direction. The slide plate 68 is preferably made of sheet metal. The slide plate 68 includes a plurality of ridges 70 that extend vertically or upward and downward relative to the roof 12 of the motor vehicle. Thus, the ridges 70 are disposed perpendicular to the exterior ribs 58 and the interior ribs 62. The ridges 70 and ribs 58, 62 reduce the surface contact between the slide plate 68 and the exterior housing 50 and the interior housing 52 and thus reduce the friction between the slide plate 68 and the exterior housing 50 and the interior housing 52.

A first side pin 72 and a second side pin 74 are fixedly connected to the slide plate 68. The first side pin 72 and the second side pin 74 extend through the first slot 64 of the interior housing 52 to engage the housing assembly 48. A pair of studs 76 are fixedly connected to the slide plate 68 and extend through the second slot 66. The studs 76, the first side pin 72, and the second side pin 74 support the slide plate 68 within the cavity 54.

The housing assembly 48 generally includes an inner housing 78 connected to an outer housing 80 that defines a space 82. The inner housing 78 includes a first inner flange 78A and a second inner flange 78B that extends from opposite sides of the inner housing 78. The first inner flange 78A includes a first inner hole 78C while the second inner flange 78B includes a second inner hole 78D. A center inner slot 78E extends through the inner housing 78 into the space 82. Likewise, the outer housing 80 includes a first outer flange 80A and a second outer flange 80B that extends from opposite sides of the outer housing 80. The first outer flange 80A includes a first outer hole 80C while the second outer flange 80B includes a second hole 80D. A center outer slot 80E extends through the outer housing 80 into the space 82. The first inner hole 78C is aligned with the first outer hole 80C, the second inner hole 78D is aligned with the second outer hole 80D, and the center inner slot 78E is aligned with the center outer slot 80E.

The first side pin 72 is disposed through the holes 78C, 78D and the second side pin 74 is disposed through the holes 80C, 80D. A first side spring 84 is disposed around the first side pin 72 between a first washer 86 and the first inner flange 78A. The first washer 86 contacts the interior housing 52 of the slide assembly 46. Thus, the first side spring 84 biases the housing assembly 48 away from the slide assembly 46. A second side spring 88 is disposed around the second side pin 74 between a second washer 90 and the second outer flange 80B. The second washer 90 contacts the interior housing 52 of the slide assembly 46. Thus, the second side spring 88 biases the housing assembly 48 away from the slide assembly 46. It should be appreciated that other biasing members may be used in place of the first side spring 84 and the second side spring 88, such as a pneumatic device, elastomeric members, etc. The center inner slot 78E and the center outer slot 80E are elongated (best seen in FIG. 4) and extend upward and downward relative to the roof 12 of the motor vehicle. The center pin 44 is disposed through the center inner slot 78E and the center outer slot 80E and thus through the space 82. The center inner slot 78E and the center outer slot 80E are sized to allow the center pin 44 to translate therein.

Figure 6:
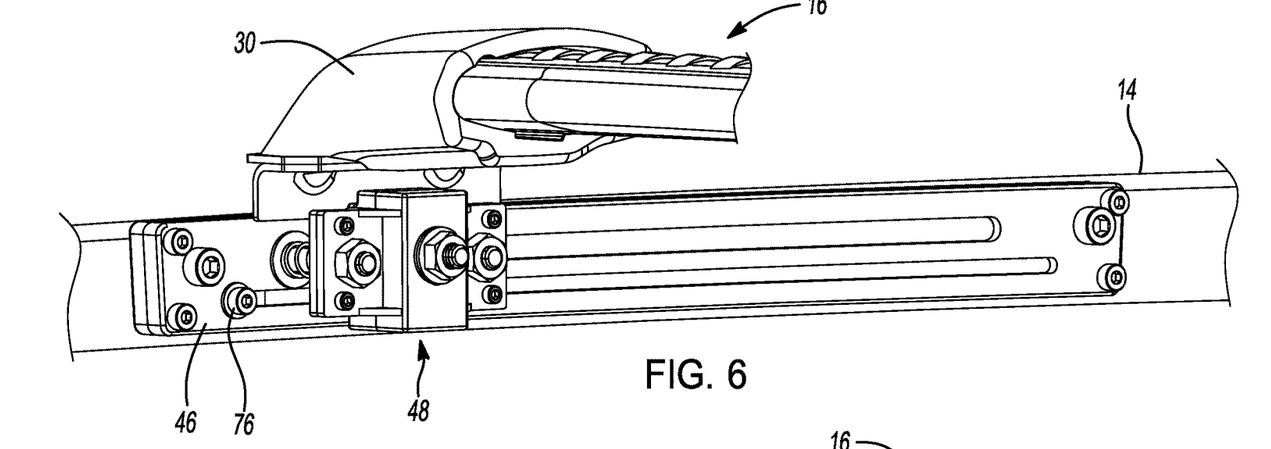
FIG. 6 is a perspective view of the adjustable roof rack in a forward position.
Figure 7:
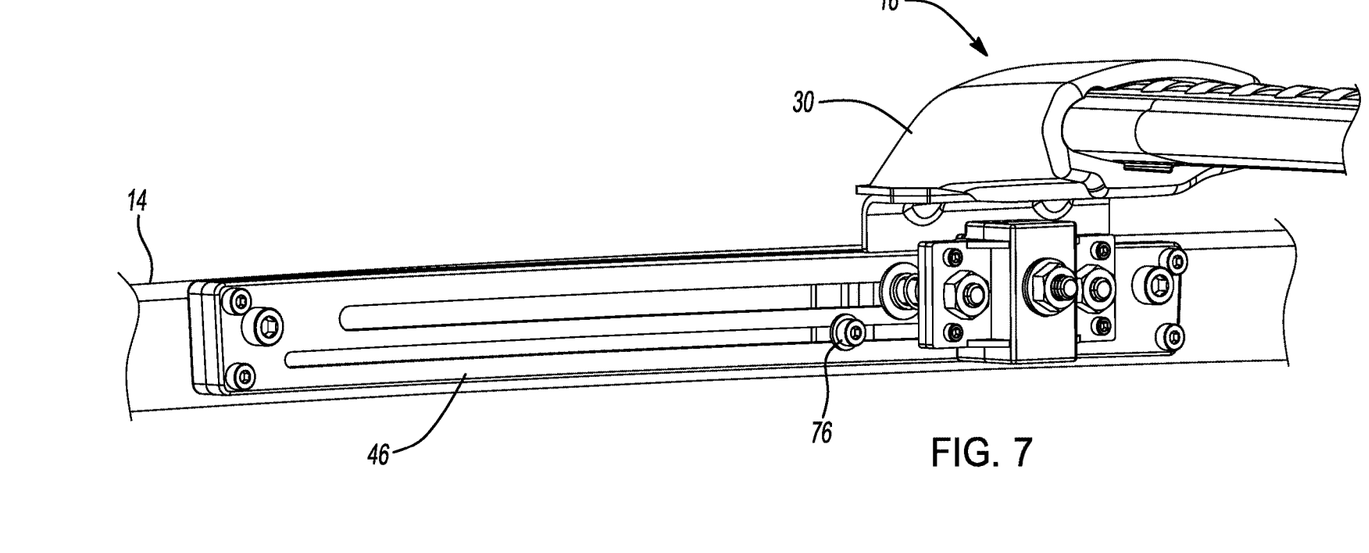
FIG. 7 is a perspective view of the adjustable roof rack in a rearward position.

A bearing block 85 is disposed within the space 82. The bearing block 85 receives the center pin 44 therethrough. The bearing block 85 allows the center pin 44 to rotate therein. The bearing block 85 is translatable in an upward and downward direction within the space 82. A center spring 92 is disposed within the space 82 between the inner and outer housings 78, 80 and the bearing block 85. The center spring 92 biases the bearing block 85, and thus the center pin 44 and the crossbar 30 connected thereto, away from the roof 12 of the motor vehicle. It should be appreciated that other biasing members may be used in place of the center spring 92, such as a pneumatic device, elastomeric member, etc. The center spring 92 is selected to not permanently deform under maximum compression. The maximum compression is defined by the length of the center slots 78E, 80E which restrict the translation of the center pin 44 relative to the housing assembly 48. The housing assembly 48 is secured to the pins 44, 72, 74 by fasteners 94, 96, 98, respectively. It should be appreciated that other types of fasteners may be employed without departing from the scope of the present disclosure. In addition, the fasteners 94, 96, 98 may include additional features, such as washers, without departing from the scope of the present disclosure The adjustable crossbar assembly 16 is moveable in a forward and rearward direction, in an inner and outer direction, in an up and down direction, and is rotatable, all with respect to the roof 12 of the motor vehicle. For example, the housing assembly 48 and thus the crossbar 30 is slidable along the slide assembly 46 between a forward position, shown in FIG. 6, and a rearward position, shown in FIG. 7. To move the housing assembly 48 and the crossbar 30, the studs 76 are loosened, allowing the slide plate 68, and the housing assembly 48 connected thereto, to slide within the cavity 54. The slide plate 68 is fixed into a position by tightening the studs 76.

Figures 8, 9:
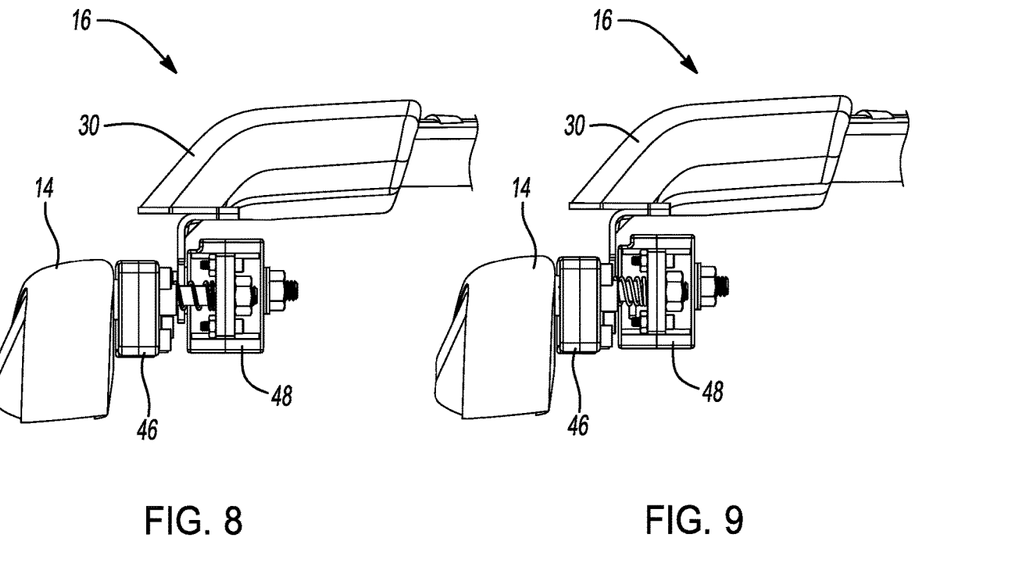
FIG. 8 is a front view of the adjustable roof rack in an inner position.
FIG. 9 is a front view of the adjustable roof rack in an outer position.

The housing assembly 48 and thus the crossbar 30 are moveable between an outer position, shown in FIG. 8, and an inner position, shown in FIG. 9. To move the housing assembly 48 and the crossbar 30 from the outer position to the inner position, the fasteners 96, 98 are tightened against the bias of the side springs 84, 88. To move the housing assembly 48 and the crossbar 30 from the inner position to the outer position, the fasteners 96, 98 are loosened. In addition, the housing assembly 48 and the crossbar 30 may be canted with respect to the slide assembly 46 by tightening one of the fasteners 96, 98 while loosening the other of the fasteners 96, 98.

Figures 10, 11:
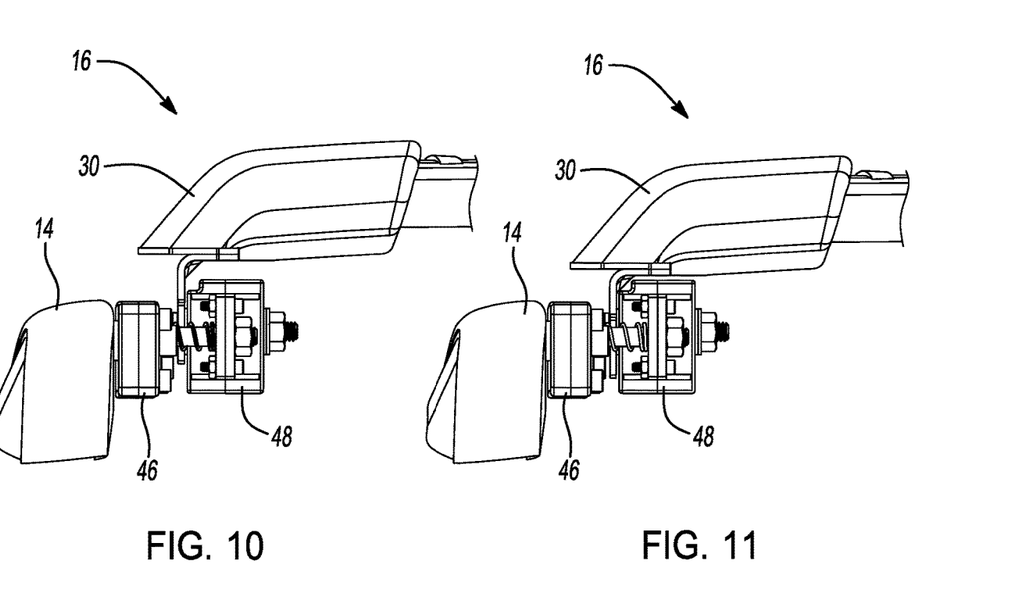
FIG. 10 is a front view of the adjustable roof rack in an upper position.
FIG. 11 is a front view of the adjustable roof rack in a lower position.

The crossbar 30 is moveable between an upper position, shown in FIG. 10, and a lower position, shown in FIG. 11. To move the crossbar 30 from the upper position to the lower position, the fastener 94 is loosened. The crossbar 30 may then be moved against the bias of the center spring 92 and the fastener 94 tightened when the crossbar 30 is at the desired position.

Figure 12:
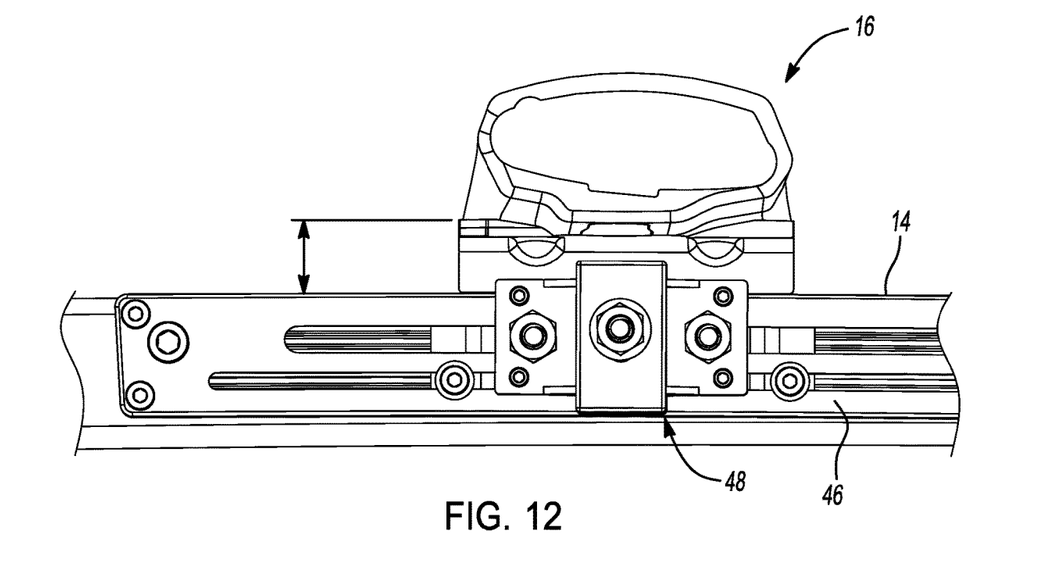
FIG. 12 is a side view of the adjustable roof rack in a parallel position.
Figure 13:
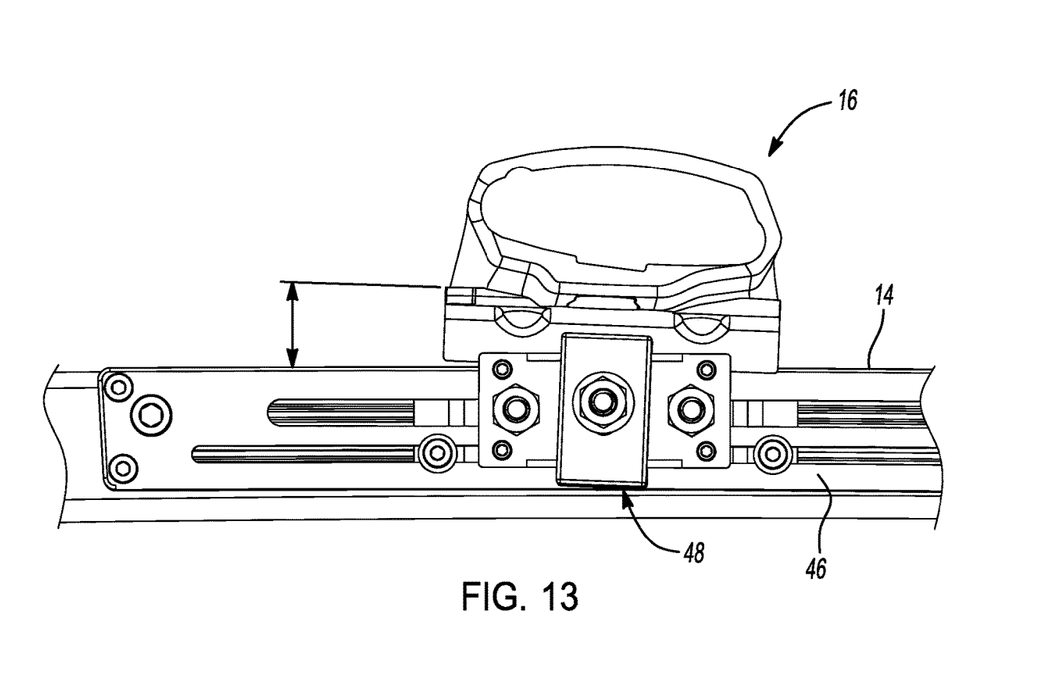
FIG. 13 is a side view of the adjustable roof rack in a non-parallel position.

The crossbar 30 is also rotatable between a parallel position, shown in FIG. 12, and a non-parallel position, shown in FIG. 13. To rotate the crossbar 30, the fastener 94 is loosened. The crossbar 30 may then be rotated between the parallel position and the non-parallel position and the fastener 94 tightened when the crossbar 30 is at the desired position.

Figure 14:
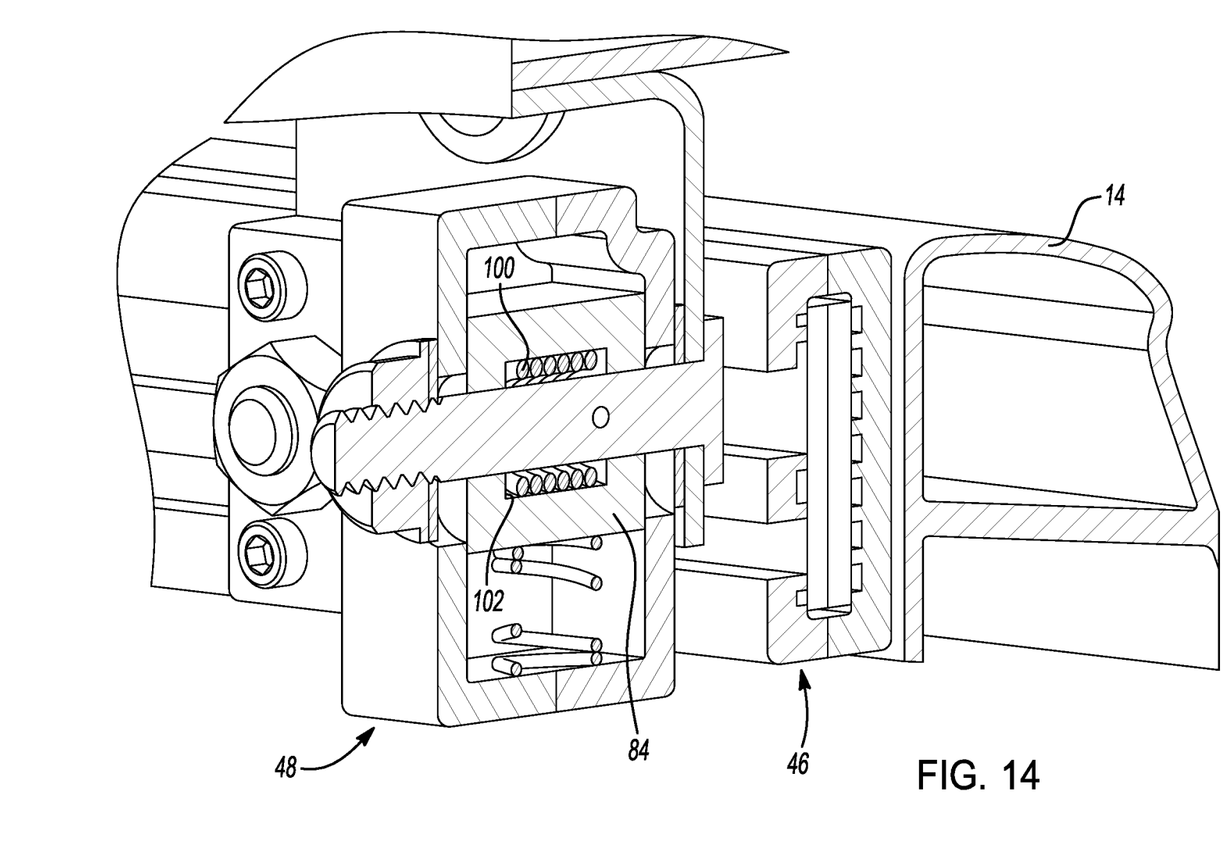
FIG. 14 is rearward looking perspective cross-sectional view of another embodiment of the adjustable roof rack.

With reference to FIG. 14, in an alternate embodiment the adjustable crossbar assembly 16 may include a torsion spring 100 disposed within an opening 102 in the bearing block 85 around the center pin 44. The torsion spring 100 is connected at one end to the bearing block 85 and at another end to the center pin 44. Thus, when rotating the crossbar 30 between parallel and non-parallel positions, the biasing force of the torsion spring 100 must be overcome.

Figure 15:
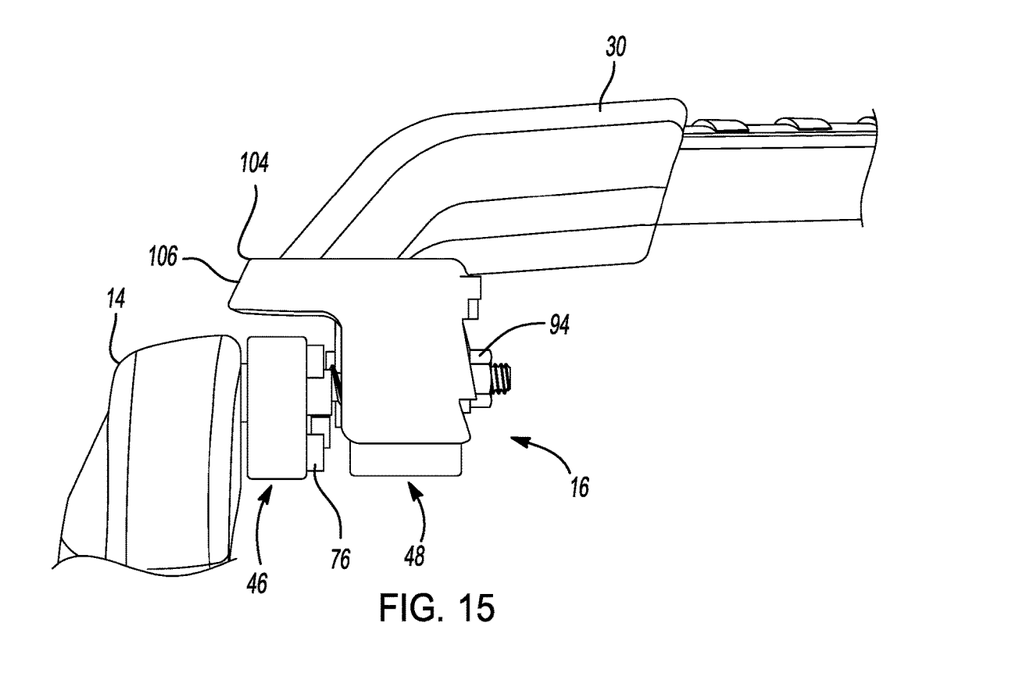
FIG. 15 is a front view of the adjustable roof rack with a cover.
Figure 16:
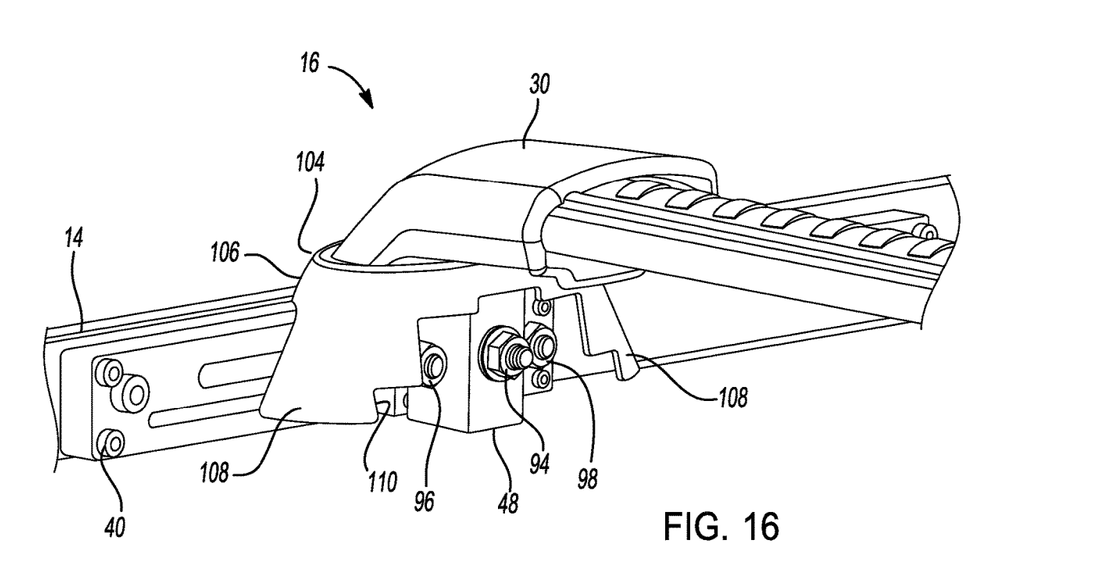
FIG. 16 is a perspective view of the adjustable roof rack with the cover.

With reference to FIGS. 15 and 16, the adjustable crossbar assembly 16 may further include a cover 104. The cover 104 protects the adjustable crossbar assembly 16 and improves aesthetics and aerodynamics while allowing the studs 76 and fasteners 94, 96, 98 to be easily accessible. Thus, the cover 104 includes a collar section 106 with two curtain sections 108 disposed forward and rearward. The studs 76 are accessible below the collar section 106. A window 110 is defined between the two curtain sections 108. The fasteners 94, 96, 98 are accessible through the window 110. Alternatively, the cover 104 may be replaced by a flexible bellows.

The roof rack 10 with the adjustment mechanism 32 offers several advantages. The adjustment mechanism 32 allows the crossbar 30 to be positioned in multiple ways to accommodate specific user needs as well as different roof rail 14 designs. Thus, the same adjustment mechanism 32 and crossbar 30 may be used to accommodate many roof designs, lengths, shapes, etc., while also accommodating different cargo carrying configurations.

The terms "forward", "rear", "inner", "inwardly", "outer", "outwardly", "above", "upper", "below", "lower", "downward", "vertically", "horizontally" and "upward" are terms used relative to the orientation of the motor vehicle as shown in the drawings of the present application. Thus, "forward" refers to a direction toward a front of a motor vehicle, "rearward" refers to a direction toward a rear of a motor vehicle, "inner" and "inwardly" refers to a direction towards the interior of a motor vehicle, and "outer" and "outwardly" refers to a direction towards the exterior of a motor vehicle, "below" refers to a direction towards the bottom of the motor vehicle, and "above" refers to a direction towards a top of the motor vehicle, etc.

Additionally, in the claims and specification, certain elements are designated as "first", "second", "third", etc. These are arbitrary designations intended to be consistent only in the section in which they appear, i.e. the specification or the claims or the summary, and are not necessarily consistent between the specification, the claims, and the summary. In that sense they are not intended to limit the elements in any way and a "second" element labeled as such in the claim may or may not refer to a "second" element labeled as such in the specification. Instead, the elements are distinguishable by their disposition, description, connections, and function.

While the embodiments illustrated and described herein include members such as bolts, studs and pins that engage a fasteners in certain configurations, the orientation of the fastener and member may be reversed to allow the other of the member or fastener to tightened or loosened.

The description of the invention is merely exemplary in nature and variations that do not depart from the gist of the invention are intended to be within the scope of the invention. Such variations are not to be regarded as a departure from the spirit and scope of the invention.

The following is claimed:

1. An adjustment mechanism for a roof rack of a vehicle, the roof rack having a roof rail and a crossbar, the adjustment mechanism comprising:
   a first pin connectable to the crossbar;
   a second pin connectable to the roof rail;
   a housing assembly disposed on the second pin, the housing assembly including a bearing and a first biasing member both disposed within the housing assembly, the bearing translatable within the housing assembly, the biasing member disposed between the bearing and the housing assembly to bias the bearing member, the first pin disposed through the bearing; and
   a second biasing member disposed on the second pin between the roof rail and the housing assembly to bias the housing assembly,
   wherein the first pin is rotatable within the bearing to rotate the crossbar, the first pin is translatable with the bearing to move the crossbar in a first direction and a second direction, and the housing assembly is translatable along the second pin to move the crossbar in a third direction and a fourth direction.

2. The adjustment mechanism of claim 1 wherein the first direction and the second direction are each one of an upward direction and a downward direction relative to the vehicle, and the third direction and the fourth direction are each one of an outward direction and an inward direction relative to the vehicle.

3. The adjustment mechanism of claim 1 further comprising a slide assembly connectable to the roof rail, the slide assembly defining a cavity and having a slot that communicates with the cavity, wherein the second pin is connected to a slide plate slidably disposed within the cavity and the second pin is disposed through the slot, and wherein the second pin and slide plate are translatable within the slide housing to move the housing assembly and the crossbar in a fifth direction and a sixth direction.

4. The adjustment mechanism of claim 3 wherein the slide assembly includes a plurality of ribs disposed in the cavity that extend along a length of the slide assembly in the fifth direction and the sixth direction.

5. The adjustment mechanism of claim 3 wherein the slide plate includes at least one ridge that is substantially perpendicular to the plurality of ribs, and wherein the ridge contacts the plurality of ribs.

6. The adjustment mechanism of claim 3 wherein the slide assembly includes a second slot substantially parallel with the first slot, and a stud is fixedly connected to the slide plate and is disposed through the second slot.

7. The adjustment mechanism of claim 3 wherein the fifth direction and the sixth direction are each one of a forward direction and a rearward direction relative to the vehicle.

8. The adjustment mechanism of claim 1 further comprising:
- a third pin connectable to the roof rail, wherein the housing assembly is disposed on the third pin; and
- a third biasing member disposed on the third pin between the roof rail and the housing assembly to bias the housing assembly.

9. The adjustment mechanism of claim 1 further comprising a first fastener disposed on the first pin and a second fastener disposed on the second pin.

10. The adjustment mechanism of claim 1 wherein the first biasing member biases the bearing in one of the first direction and the second direction.

11. The adjustment mechanism of claim 1 wherein the second biasing member biases the housing assembly in one of the third direction and the fourth direction.

12. The adjustment mechanism of claim 1 further comprising a torsion spring disposed within the bearing and connected to the first pin and the bearing.

13. An adjustable roof rack for a vehicle, the adjustable roof rack comprising:
- a roof rail connected to the vehicle;
- a crossbar;
- a first pin fixedly connected to the crossbar;
- a second pin interconnected to the roof rail;
- a housing assembly disposed on the second pin, the housing assembly including a bearing and a first biasing member both disposed within the housing assembly, the bearing translatable within the housing assembly, the biasing member disposed between the bearing and the housing assembly to bias the bearing member, the first pin disposed through the bearing; and
- a second biasing member disposed on the second pin between the roof rail and the housing assembly to bias the housing assembly,
- wherein the first pin is rotatable within the bearing to rotate the crossbar, the first pin is translatable with the bearing to move the crossbar in a first direction and a second direction, and the housing assembly is translatable along the second pin to move the crossbar in a third direction and a fourth direction.

14. The adjustable roof rack of claim 13 wherein the crossbar includes a bracket connected to a stanchion, and the first pin is fixedly connected to the bracket.

15. The adjustable roof rack of claim 13 further comprising a cover connected to the crossbar, the cover disposed overtop at least a portion of the housing assembly.

16. The adjustable roof rack of claim 13 further comprising a slide assembly connected to the roof rail, the slide assembly defining a cavity and having a slot that communicates with the cavity, wherein the second pin is connected to a slide plate slidably disposed within the cavity and the second pin is disposed through the slot, and wherein the second pin and slide plate are translatable within the slide housing to move the housing assembly and the crossbar in a fifth direction and a sixth direction.

17. The adjustable roof rack of claim 16 wherein the slide assembly is connected to an interior surface of the roof rail.

18. The adjustable roof rack of claim 13 wherein the housing assembly includes a flange extended therefrom and a hole disposed in the flange, and the second pin is disposed through the hole.

19. The adjustable roof rack of claim 13 wherein the housing assembly defines a space, the bearing disposed within the space, and the housing assembly includes a first slot and a second slot that each communicate with the space, and the first pin is disposed through the first slot, the bearing, and the second slot.

20. An adjustable roof rack for a vehicle, the adjustable roof rack comprising:
- a roof rail connected to the vehicle;
- a crossbar;
- a first pin fixedly connected to the crossbar;
- a slide assembly defining a cavity and having a slot in communication with the cavity, the slide assembly connected to the roof rail;
- a slide plate disposed within the cavity and translatable within the cavity;
- a second pin connected to the slide plate and disposed through the slot of the slide assembly;
- a housing assembly disposed on the second pin, the housing assembly including a bearing and a first biasing member both disposed within the housing assembly, the bearing translatable within the housing assembly, the biasing member disposed between the bearing and the housing assembly to bias the bearing member, the first pin disposed through the bearing; and
- a second biasing member disposed on the second pin between the roof rail and the housing assembly to bias the housing assembly,
- wherein the first pin is rotatable within the bearing to rotate the crossbar, the first pin is translatable with the bearing to move the crossbar in a first direction and a second direction, the housing assembly is translatable along the second pin to move the crossbar in a third direction and a fourth direction, and the slide plate and the second pin is translatable to move the crossbar in a fifth direction and a sixth direction.

* * * * *